Sept. 10, 1957 F. S. WELLS 2,805,752
SIDE LOADING AND UNLOADING MOVING SIDEWALK
Filed June 2, 1953 2 Sheets-Sheet 2
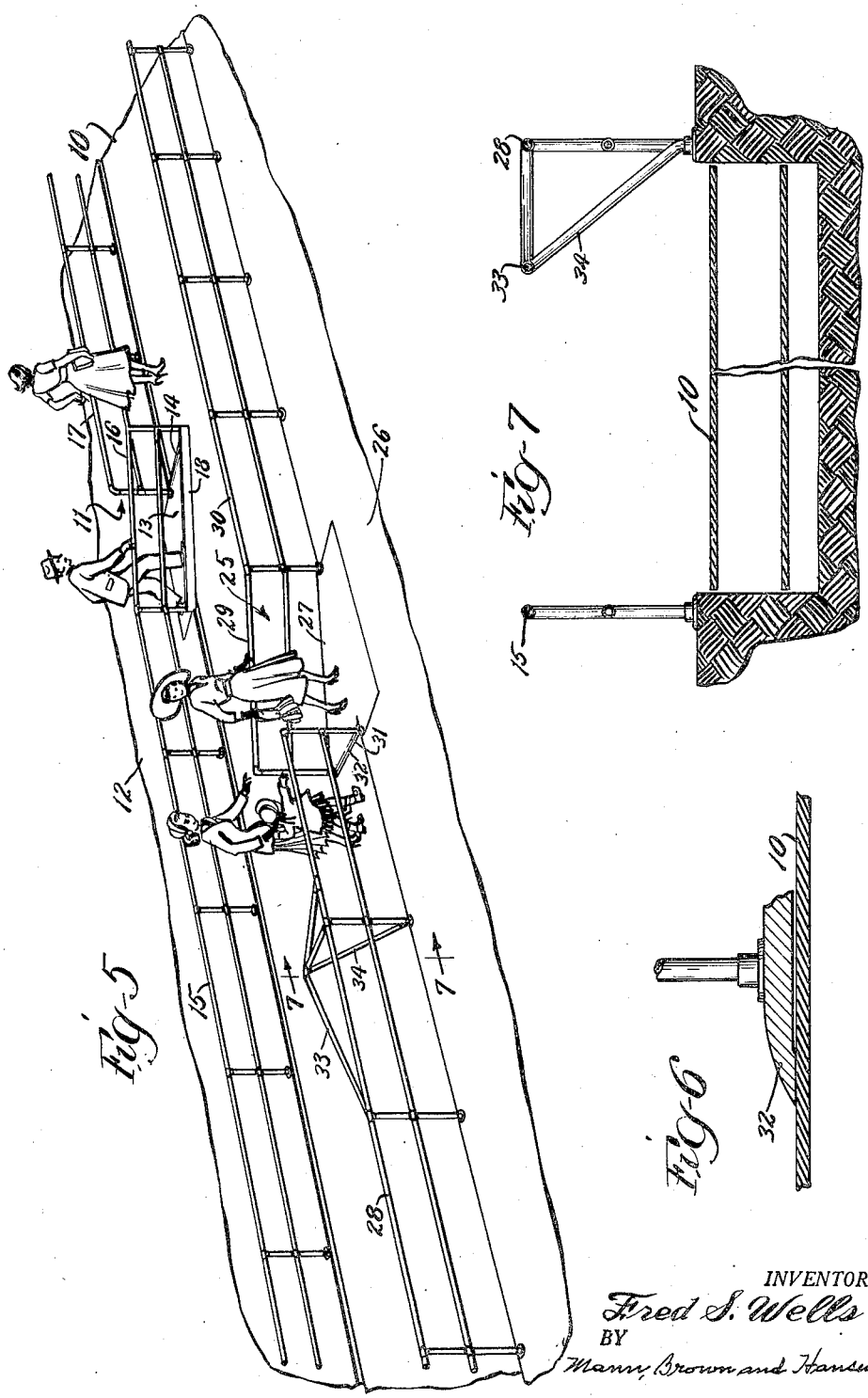
INVENTOR.
Fred S. Wells.
BY
Mann, Brown and Hansmann
Attys.

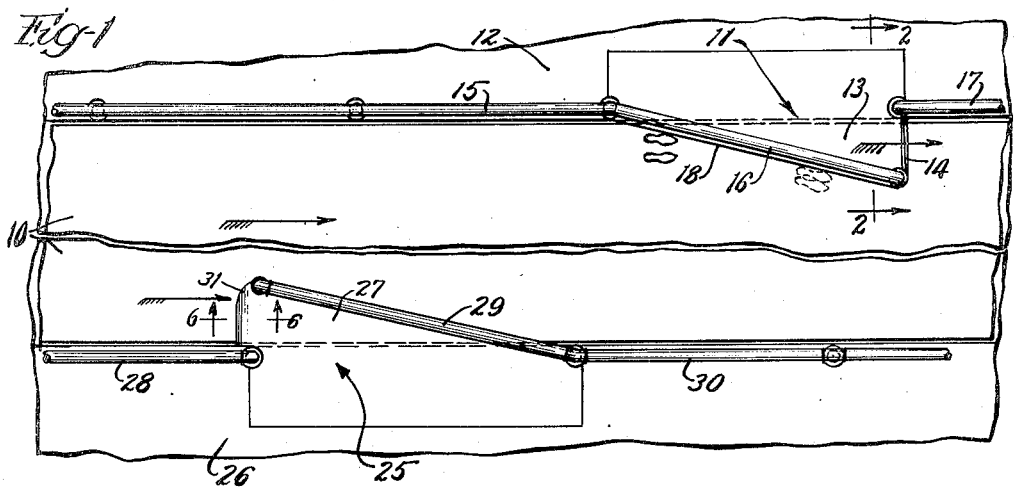
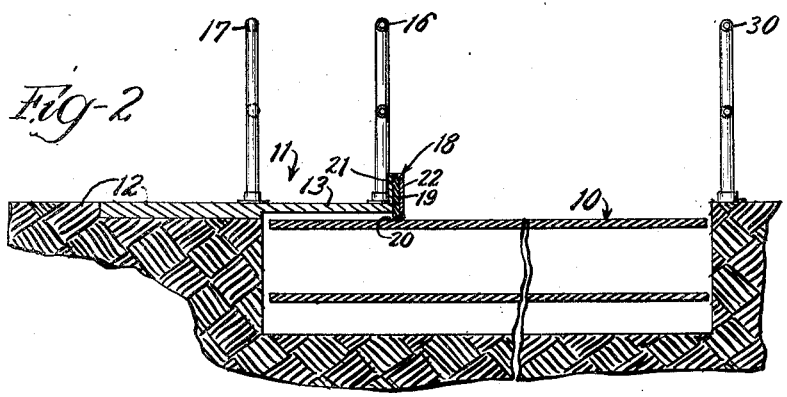
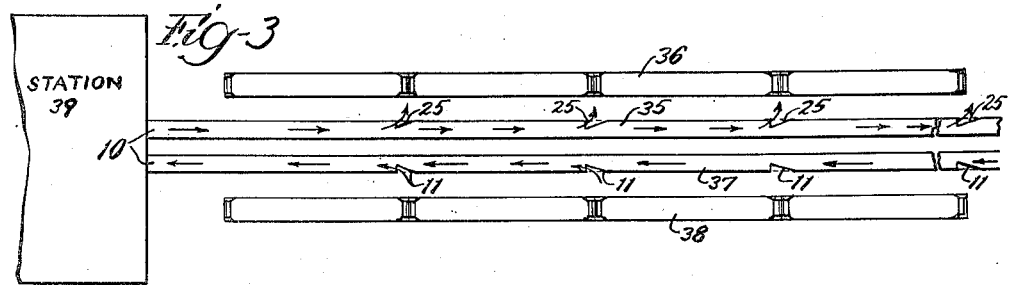
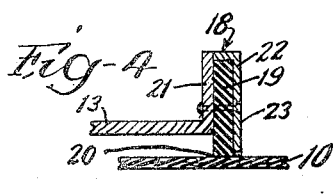

United States Patent Office 2,805,752
Patented Sept. 10, 1957

2,805,752

SIDE LOADING AND UNLOADING MOVING SIDEWALK

Fred S. Wells, Aurora, Ill., assignor to Stephens-Adamson Mfg. Co., a corporation of Illinois Application June 2, 1953, Serial No. 359,145

7 Claims. (Cl. 198—16)

It has long been sought to transport passengers with a continuously moving platform such as a belt conveyor, linked or not. But passengers cannot ordinarily board a moving belt from a stationary platform at one side, nor alight from a moving belt to a stationary platform at one side. Hence, passengers have heretofore been usually loaded or unloaded at the ends of the conveyors.

The principal object of this invention is to make loading and unloading of a conveyor from the side safe and practical.

Generally speaking, this is accomplished by providing platforms overhanging side portions of the conveyor so that passengers will enter and leave the conveyor while moving in substantially the same direction as the conveyor. The invention is applicable to conveyors that are reversed at times, as for example, moving in one direction in the morning and the opposite direction in the evening, and suitable means are provided for deflecting a passenger toward the center of the belt when approaching a side loading platform. Similarly, means are preferably provided for deflecting the passengers toward the center of the belt in approaching an unloading platform so that a deliberate movement on the belt toward the unloading platform is required by those wishing to leave the belt at a particular side unloading platform.

The preferred embodiment of the invention is shown in the accompanying drawings, in which:

Fig. 1 is a plan view of an intermediate portion of a passenger transport conveyor with a loading platform at one side and an unloading platform at the other;

Fig. 2 is a section on the line 2—2 of Fig. 1;

Fig. 3 is a plan view showing the apparatus applied to a railway station;

Fig. 4 is an enlarged section through the foot guard shown in Fig. 2;

Fig. 5 is a perspective view illustrating the movement of passengers in loading and unloading;

Fig. 6 is a section on the line 6—6 of Fig. 1; and

Fig. 7 is a vertical section on the line 7—7 of Fig. 5.

But these diagrammatic drawings and the corresponding description are used for the purpose of disclosure only, and are not intended to impose unnecessary limitations on the claims.

In Fig. 1, 10 indicates a portion of a passenger transport conveyor illustrated as a simple belt, which is assumed to be supported and driven in any suitable manner; but other types of conveyors will serve.

Generally indicated at 11 is a loading station including a stationary platform 12 alongside the conveyor 10 and provided with a suitable supporting structure from which a triangular loading platform 13 projects over the adjacent side portion of the conveyor 10 close to the upper tread or passenger supporting surface. The outer side of the loading platform 13 is open for entrance from the platform 12, and the right end in Fig. 1 indicated by 14 is open for passengers to step down onto the upper tread of the moving conveyor 10.

Suitable hand rails 15, 16, and 17 are provided on the platforms 12 and 13 for the convenience and safety of the passengers.

Along the inner or overhanging side of the platform 13, there is a foot guard generally indicated by 18 which includes a resilient element 19 made of rubber-like material having its lower edge 20 in substantial wiping relation to the upper tread surface of the conveyor belt 10. As shown in Fig. 4, the resilient element is clamped against the flange 21 on the platform 13 by an angle-shaped strip of metal 22, the outer side 23 of which is straight and smooth to enable the drag of the conveyor belt 10 to move the passenger's foot or feet (see Fig. 1) laterally (or downwardly in Fig. 1) to force those feet away from the projecting platform 13 into a clear space on the conveyor. In practice, a device such as shown has given satisfactory service with the conveyor belt running three miles an hour and a guard at an angle substantially as shown.

Generally indicated at 25, there is an unloading station including a platform 26 on a suitable supporting structure from which a triangular unloading platform 27 projects over the adjacent side portion of the conveyor belt 10.

Hand rails 28, 29, and 30 extend along the platforms 26 and 27 for the safety and convenience of the passengers.

The overhanging end 31 of the platform 27 is open to permit passengers to step from the tread surface of the moving conveyor belt 10 onto the platform 27, and then walk out onto the stationary platform 26.

That end 31 of the platform 27 is provided with a suitable sloping footplate or takeoff plate 32 close to the surface of the belt 10 to guide the passenger's feet up onto the platform in much the same way as the familiar comb-plates used with escalators.

In order to warn passengers approaching the unloading station 25, a warning deflector means comprising a special guard rail 33 projecting from the hand rail 28 and braced as indicated at 34 extends over the belt 10 as far as the extreme edge of the platform 27 or further, so that a passenger not intending to alight at the station 25 will be directed clear of the station and may proceed on his way, or a passenger wishing to alight at 25 may simply move toward the outer margin of the belt into convenient position to step into the entrance 31 of the platform 27.

The hand rails 15, 16, 17, 28, 29, and 30 comprise parapet or guide means for restraining the passengers from transferring between the conveyor belt and the platforms other than at the entrances and exits provided.

In Fig. 3, an apparatus corresponding to that described is shown at 35 alongside a train of cars 36; and, as indicated by the arrows, passengers may travel on the conveyor to an unloading station 25 adjacent to the entrance to a car, and there step off and entrain.

The conveyor 35 may be run to the right in Fig. 3 for passengers to board cars 36, and to the left for passengers to go to the station 39.

Additional apparatus 37 can serve another train 38, and so on through a terminal.

In a reversible apparatus for a railway, such as shown in Fig. 3, the side stations are belt-unloading stations when the apparatus is run to the right, and belt-loading stations when run to the left; and all of the long overhanging sides of the stations will be provided with foot guards 18.

I claim:

1. In a passenger transport apparatus, a conveyor moving in a circuit and having an upper tread for passengers, a stationary support at one side of said conveyor, a passenger platform on the support at an angle to and projecting over one side of the conveyor, and a foot guard between the platform and the upper tread of the conveyor at an angle to the direction of travel and including a resilient element in substantial wiping relation to the upper tread and a slide element along which the passenger's foot may slide past the platform.

2. In a passenger transport apparatus, a conveyor moving in a circuit and having an upper tread for passengers moving in a forward direction, a stationary support at one side of said conveyor, a passenger platform carried by the support and projecting over said one side of the conveyor at least the width of an average passenger, but less than the width of the conveyor, and a foot guard extending at an angle rearwardly from the outer portion of the platform to a point adjacent said one side of the conveyor for deflecting passengers away from said platform when the platform is approached from the rear.

3. A passenger transport apparatus as set forth in claim 2, in which the foot guard spans the gap between the platform and the upper tread of the conveyor, and includes a resilient element in substantial wiping relation to the upper tread, and a substantially rigid slide element along which the passenger's foot may slide past the platform.

4. In a passenger transport apparatus, a conveyor moving in a circuit and having an upper tread surface for passengers moving in a forward direction, a passenger platform extending over one side margin of the conveyor at least the width of an average passenger, but less than the width of the conveyor, and a warning deflector spaced rearwardly from the platform but in close proximity thereto, said warning deflector projecting over said one margin of the conveyor at least to an extent substantially equal to the width of the platform, whereby passengers are warned to stay clear of the platform unless disembarking.

5. The passenger transport apparatus as set forth in claim 4 in which said warning deflector includes a guard rail extending from a point adjacent said side margin of the conveyor and forwardly and inwardly therefrom.

6. In a passenger transport apparatus, the combination of an endless ribbon-type conveyor having a continuous transport surface extending between spaced points for continuously transporting passengers thereon between such points, and a passenger transfer station alongside the transport surface and at substantially the same level, a substantially horizontal and flat platform at said station projecting over and in close proximity to said transport surface, a parapet along the outer projecting margin of the platform, said platform extending over the transport surface at least the width of an ordinary person but only a fraction of the width of the transport surface, whereby passengers may transfer between the transport surface and said transfer station without interfering with other passengers being carried on the transport surface between said spaced points, said platform being of relatively thin construction, whereby passengers may transfer between the platform and the transport surface with normal walking cadence and while walking in the direction of travel of the transport surface.

7. The combination as set forth in claim 6 in which the platform in plan elevation is generally a right triangle and has the parapet extending along the hypotenuse thereof.

References Cited in the file of this patent

UNITED STATES PATENTS

| | | |
|---|---|---|
| 440,725 | Schmidt et al. | Nov. 18, 1890 |
| 1,668,644 | Hocquart et al. | May 8, 1928 |
| 2,044,134 | Storer | June 16, 1936 |

FOREIGN PATENTS

| | | |
|---|---|---|
| 759,915 | France | Dec. 6, 1933 |